United States Patent [19]

Sano et al.

[11] Patent Number: 5,071,329
[45] Date of Patent: Dec. 10, 1991

[54] SCROLL TYPE FLUID TRANSFERRING MACHINE WITH THERMOPLASTIC OLDHAM RING

[75] Inventors: Fumiaki Sano; Norihide Kobayashi; Hiroshi Ogawa, all of Tokyo; Noboru Masuda, Shizuoka, all of Japan

[73] Assignee: Mitsubishi Denki Kabushiki Kaisha, Tokyo, Japan

[21] Appl. No.: 483,727

[22] Filed: Feb. 23, 1990

[30] Foreign Application Priority Data

Mar. 6, 1989 [JP] Japan .................... 1-53576

[51] Int. Cl.⁵ .......................... F01C 1/04; F16D 3/04
[52] U.S. Cl. .................................. 418/55.3; 418/56; 464/102; 464/903
[58] Field of Search .................. 418/55.3, 56, 152; 464/102, 903

[56] References Cited

U.S. PATENT DOCUMENTS

| 4,702,683 | 10/1987 | Inaba et al. | 418/57 |
| 4,958,993 | 9/1990 | Fujio | 418/55.3 |

FOREIGN PATENT DOCUMENTS

| 2409554 | 9/1975 | Fed. Rep. of Germany | 418/152 |
| 55-87884 | 7/1980 | Japan . | |
| 59-160083 | 9/1984 | Japan | 418/55.3 |
| 61-197782 | 9/1986 | Japan | 418/56 |
| 62-199981 | 9/1987 | Japan | 418/56 |
| 63-85278 | 4/1988 | Japan | 418/56 |
| 8809356 | 12/1988 | World Int. Prop. O. | 418/56 |

*Primary Examiner*—John J. Vrablik
*Attorney, Agent, or Firm*—Oblon, Spivak, McClelland, Maier & Neustadt

[57] ABSTRACT

A scroll type fluid transferring machine comprises a stationary scroll having a wrap member, a movable scroll having a wrap member combined with the stationary scroll, a driving means for causing the movement of revolution of the movable scroll along a circular orbit so as to make the movable scroll line-contact with the stationary scroll whereby a closed space is produced between the stationary and movable scrolls, and an Oldham ring for maintaining the stationary and movable scrolls at predetermined positions while the movement of rotation of the both scrolls are prevented, wherein the Oldham ring is formed by injection-molding at least one thermoplastic resinous material selected from the group consisting of polyphenylene sulfide, polyetheretherketone, polyetherketone, wholly aromatic polyester, polysulfone, polyarylsulfone, polyether sulfone, polyetherimide, polyoxybenzyliden polyketonsulfide, polythioethersulfone and polyarylate.

3 Claims, 3 Drawing Sheets

SCROLL TYPE FLUID TRANSFERRING MACHINE WITH THERMOPLASTIC OLDHAM RING

BACKGROUND OF THE INVENTION

Field of the Invention

The present invention relates to a scroll type fluid transferring machine. More particularly, it relates to a scroll type fluid transferring machine such as a scroll compressor, a scroll vacuum pump or the like used for, for instance, a refrigerant compressor.

In the scroll type fluid transferring machine of the present invention, a pair of wrap members are combined so that the positions of the center of the wrap members are apart from each other, and they are subjected to a relative circular motion (a movement of revolution) wherein the capacity defined by a closed space between the both wrap members is gradually changed. In the scroll type fluid transferring machine, there is provided an Oldham coupling as a slip joint element which maintains the center of the pair of wrap members at predetermined positions and which functions as a kind of rotation-preventing mechanism.

The principle of the movement of the scroll type fluid transferring machine of this kind is well known. The principle of the operations of a scroll compressor will be described with reference to FIG. 2.

FIGS. 2a, 2b, 2c and 2d respectively show states of a pair of wrap members combined with each other.

When the two wrap members 1, 2 are arranged so that they are combined with each other and their centers are determined at predetermined positions, a closed space 3 is defined by their bottoms, and side walls which are in contact with each other at two line-contact portions between the two wrap members 1, 2. Now, when one of the wrap members is revolved around the other so that the center 0' of the revolving wrap member moves around the center 0 of the other wrap member with a radius 0—0' while the rotation of the revolving wrap member is prohibited, the capacity of the closed space 3 is gradually decreased. Namely, when the wrap member 1 is revolved from a state as shown in FIG. 2a at angles of revolution of 90°, 180° and 270° respectively, the volume of the closed spaces 3, 3 are gradually decreased as shown in FIGS. 2b, 2c and 2d. In FIG. 2a showing a state of the wrap members at an angle of revolution of 360°, the closed spaces 3, 3 are communicated with each other at the central portion of the wrap members. Further, in FIGS. 2b, 2c and 2d which show states of the wrap members which move by subsequent 90°, the volume of the closed spaces 3, 3 become small. In the state of FIG. 2d, the spaces reach substantially zero. Open spaces formed in the outer portions of the wrap members (as shown in FIG. 2b) develop closed spaces in the course of states as shown in FIGS. 2c, 2d and 2a during which a fresh fluid is introduced therein.

Thus, by providing side plates at both ends in the axial direction of the wrap members 1, 2 and by forming a discharge hole 4 at the central portion of one of the side plates as shown in FIG. 2a, fluid introduced from the radially outer portion in the axial direction of the wrap members is compressed and discharged through the discharge hole 4. When the wrap members are relatively revolved in the opposite directions, the wrap members serve as a vacuum pump wherein the hole formed at the center of the side plate serves as an intake opening.

In the scroll type fluid transferring machine as described above, an Oldham ring is used which has been known in, for instance, Japanese Unexamined Patent Publication No. 107284/1987. FIG. 3. is a perspective view partly broken in a disassembled state of an important portion of the Oldham ring disclosed in the above-mentioned publication. In FIG. 3, a reference numeral 5 designates an Oldham ring, numerals 5a, 5b designate two pairs of projections formed on the Oldham ring so that the each pair of projections are opposing diametrically on the surfaces opposite to each other and lines connecting the opposing projections 5a, 5b are crossed perpendicularly, a-numeral- 6 designates a movable scroll, numerals 6a, 6b designates grooves formed in the movable scroll 6 so that the grooves can receive the projections 5a of the Oldham ring 5, a numeral 7 designates a bearing member coupled with the stationary scroll, numerals 7a, 7b designate grooves formed in the bearing member 7 so as to receive the projections 5b of the Oldham ring and a numeral 8 designates a crank shaft.

The movable scroll 6 and the Oldham ring 5 are so adapted that the projections 5a are fitted to the grooves 6a, 6b, and the beating member 7 and the Oldham ring 5 are so adapted that the projections 5b are fitted to the grooves 7a, 7b, whereby position of the movable scroll 6 to the bearing member 7 is determined and the movement of rotation of the movable scroll 6 is prevented.

In the conventional scroll type fluid transferring machine, very high accuracy is required in order to assure the relative positions of the wrap members. Namely, accuracy in perpendicularity, straightness, parallelism and dimensions in each of the projections and the straightness of the projections to the ring portion of the Oldham ring are required. Further, since machining operations are required to shape the side surfaces of each of the projections, the manufacturing cost is pushed up. In addition, the weight of the Oldham ring has to be reduced because inertia and imbalance vibrations caused by reciprocating slip motions of the Oldham ring have to be reduced.

SUMMARY OF THE INVENTION

It is an object of the present invention to provide a scroll type fluid transferring machine having an improved Oldham ring of light weight, a sufficient strength, durable for use and resistance to wearing.

The foregoing and other objects of the present invention have been attained by providing a scroll type fluid transferring machine which comprises a stationary scroll having a wrap member, a movable scroll having a wrap member combined with the stationary scroll, a driving means for causing the movement of revolution of the movable scroll along a circular orbit so as to make the movable scroll line-contact with the stationary scroll whereby a closed space is produced between the stationary and movable scrolls, and an Oldham ring for maintaining the stationary and movable scrolls at predetermined positions while the movement of rotation of the both scrolls are prevented, wherein the oldham ring is formed by injection-molding at least one thermoplastic resinous material selected from the group consisting of polyphenylene sulfide, polyetheretherketone, polyetherketone, wholly aromatic polyester, polysulfone, polyarylsulfone, polyethersulfone, polyetherimide, polyoxybenzyliden polyketonsulfide, polythioethersulfone and polyarylate.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF PREFERRED EMBODIMENTS

Figure 1:
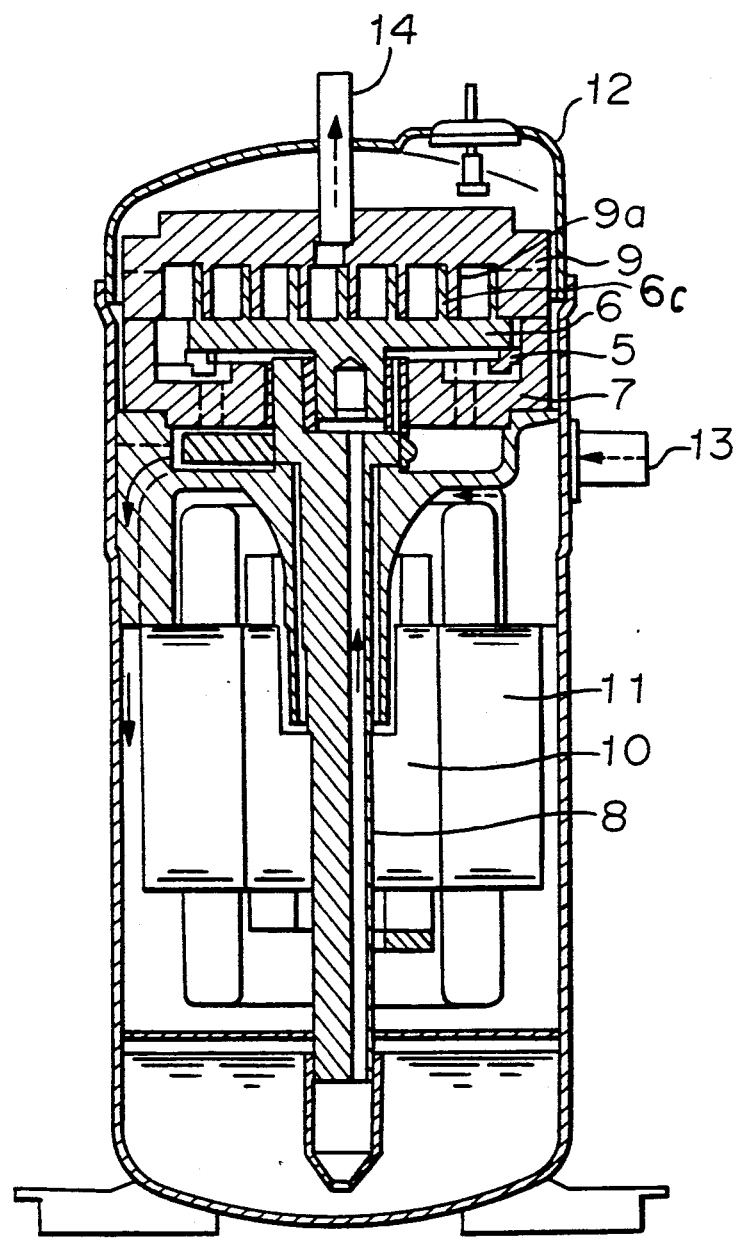
FIG. 1 is a longitudinal cross-sectional view of an embodiment of the scroll type compressor according to the present invention.
Figure 2:
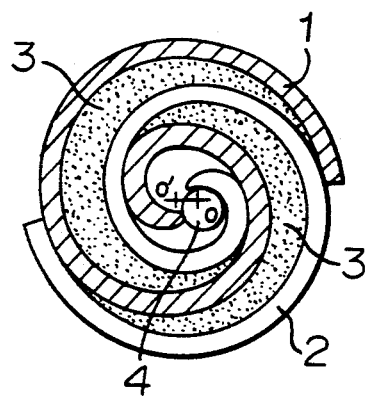
FIGS. 2a, 2b, 2c and 2d are respectively diagrams showing states of the wrap members of the scroll compressor during operations.
Figure 2:
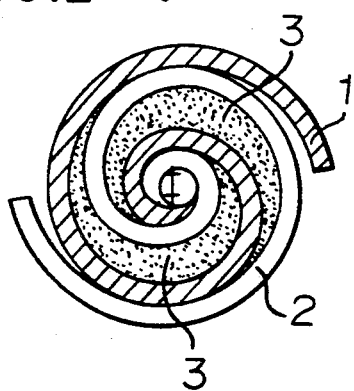
Figure 2:
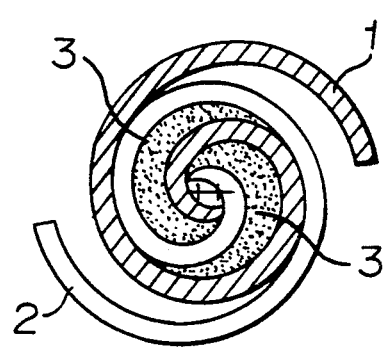
Figure 2:
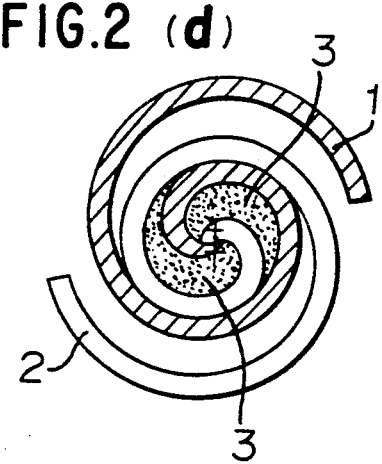
Figure 3:
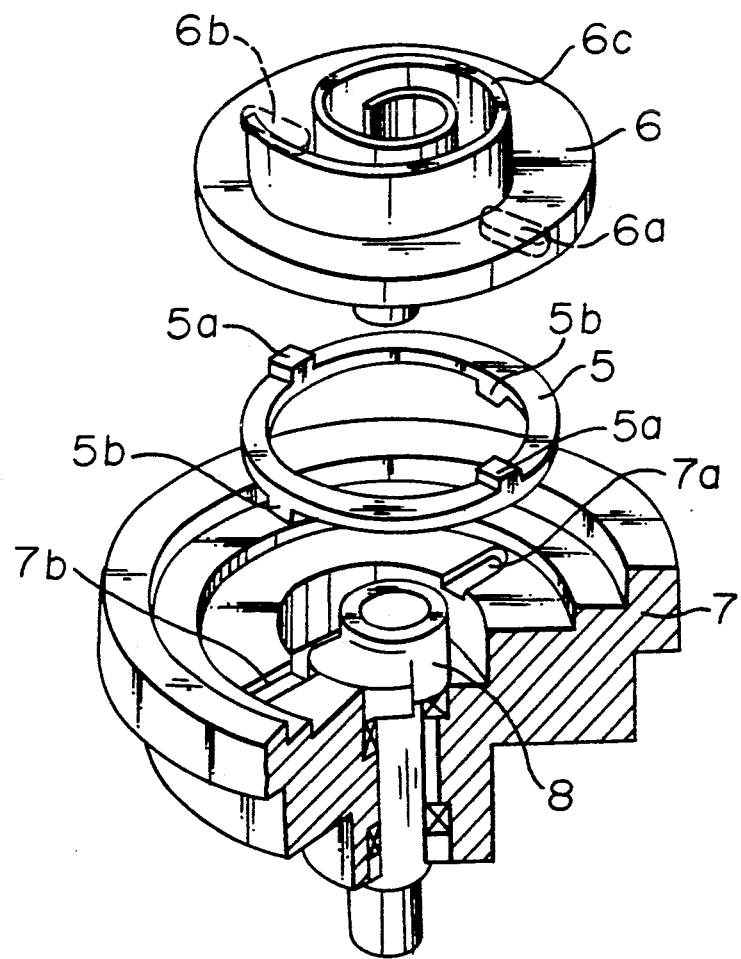
FIG. 3 is a perspective view partly broken in a disassembled state of an important part of a conventional scroll compressor.

Referring to the drawings wherein the same reference numerals designate the same or corresponding parts throughout the several views, and more particularly to FIG. 1 thereof, there is shown a longitudinal cross-sectional view of an embodiment of the closed type scroll compressor according to the present invention. In FIG. 1, a reference numeral 5 designates an Oldham ring made of a material which will be described hereinafter, a numeral 6 designates a movable scroll, a numeral 6c designates the wrap member of the movable scroll, a numeral 7 designates a bearing member, a numeral 8 designates a crank shaft, a numeral 9 designates a stationary scroll, a numeral 9a designates the wrap member of the stationary scroll, a numeral 10 designates the rotor of a motor, a numeral 11 designates a stator, a numeral 12 designates a sealed container, a numeral 13 designates an intake pipe, and a numeral 14 designates a discharge pipe.

The movable scroll 6 is arranged at a predetermined position to the bearing member 7 by means of the Oldham ring 5. The movable scroll 6 is combined with the stationary scroll 9 which is located at a predetermined position to the bearing member 7 by means of a reference hole (not shown) so that a closed space or closed spaces are formed between the movable and stationary scrolls 6, 9.

The crank shaft 8 driven by the rotor 10 and the stator 11 of the motor transmits a torque to the movable scroll 6. Since the movement of rotation of the movable scroll 6 is prohibited by the Oldham ring 5, the movable scroll 6 is subjected only to the movement of revolution along a circular orbit, whereby fluid in the closed space or the closed spaces is compressed. Accordingly, a refrigerant gas introduced-in the sealed container 12 through the intake pipe 13 is discharged through the discharge pipe 14 via the scroll compression chamber.

In the above-mentioned construction of the scroll compressor, the Oldham ring 5 to prevent the movement of rotation of the movable scroll 6 is formed by a thermoplastic resin having sufficient resistance to heat, a cooling agent, oil and wear, and a sufficient strength under actual use as shown in Table 1. Accordingly, the weight of the Oldham ring can be reduced. As a result, the mass of reciprocating movements can be reduced and the vibrations in the operation of the compressor can be reduced.

A fiber reinforcing material such as carbon fibers, glass fibers, potassium titanate wiskers may be added to the resinous material so as to reinforce the strength of the material. The admixturer to be added thereto reduces an amount of resin, and a light weight Oldham ring can be obtained. It is preferable to incorporate the fiber reinforcing meterial in a range of from 20% by weight to 50% by weight. If an amount of the material to be incorporated is less than 20 wt %, the effect by the incorporation is small. If the amount is larger than 50 wt %, a resulted product is fragile and is not practical.

A friction in the sliding movement between the projections of the Oldham ring and the grooves formed in the bearing portion and the movable scroll can be reduced by applying a solid lubricating agent to thereby reduce loss of power. Further, the wearing of the projections and the grooves can be reduced.

Table 1 shows resinous materials and their characteristics thereof used for the Oldham ring of the present invention as well as resinous materials including 30% by weight of glass fibers and the characteristics thereof. The characteristic of each material in Table 1 satisfy requirements for the materials of the scroll type fluid transferring machine under the actual operations. However, as is evident from Table 1, polyketonsulfide has the most satisfactory characteristics from the view points of heat deformation temperature and tensile strength.

The same effect can be achieved by using carbon fibers or potassium titanate wiskers as an admixture.

TABLE 1

| | Heat deformation temperature (°C.) | Tensile strength (kgf/mm²) | Bending modulus (kgf/mm² × 10²) | Resistance to cooling agent and oil | |
|---|---|---|---|---|---|
| | | | | Weight change (%) | Volume change (%) |
| Polyphenylene sulfide | 260 (260) | 7.5 (13.5) | 4.3 (15.6) | 0 | 0 |
| Polyetheretherketone | 152 (300) | 9.9 (17.6) | 3.8 (11.5) | 0 | 0 |
| Polyetherketone | 186 (358) | 10.5 (18.5) | 5.0 (13.0) | 1 | 1 |
| Wholly aromatic polyester | 295 (300) | 7.5 (10.5) | 4.9 (10.8) | 0 | 1 |
| Polysulfone | 175 (185) | 7.2 (13) | 2.8 (10) | 3 | 2 |
| Polyarylsulfone | 204 | 8.4 | 2.8 | 2 | 2 |

TABLE 1-continued

|  | Heat deformation temperature (°C.) | Tensile strength (kgf/mm²) | Bending modulus (kgf/mm² × 10²) | Resistance to cooling agent and oil | |
| --- | --- | --- | --- | --- | --- |
|  |  |  |  | Weight change (%) | Volume change (%) |
| Polyethersulfone | 203 | 8.6 | 25.6 | 0 | 1 |
| Polyetherimide | 200 (210) | 10.7 (16.3) | 5.2 (12.0) | 1 | 0 |
| Polyoxybenzyliden | 293 | 7.5 | 4.7 | 1 | 1 |
| Polyketonsulfide | 350 | 18 | 11 | 1 | 1 |
| Polythioethersulfone | 240 (260) | 10 (14) | 6 (10) | 0 | 0 |
| Polyarylate | 184 | 7.25 | 1.9 | 0 | 1 |

The values in bracket are for resinous materials including 30% by weight of glass fibers.

An experimental method of measuring resistance to a refrigerant will be described.

A medium for test, a refrigerant (R-22) and oil for refrigerator were filled in a SUS 316 pressure container (having a inner capacity of 2,000 cc) and it was left to stand for 5 days in a constant temperature bath kept at a constant temperature of 150° C. The resistance to cooling agent and oil of the tested medium were evaluated.

As described above, in accordance with the present invention, an Oldham ring for a scroll type fluid transferring machine is formed by injection-molding a specified thermoplastic resin having resistance to cooling agent and oil and a sufficient strength. Accordingly, the weight of the Oldham ring can be reduced and it can be produced at high accuracy and a low cost. Further, the durability of the Oldham ring can be expected.

Obviously, numerous modifications and variations of the present invention are possible in light of the above teachings. It is therefore to be understood that within the scope of the appended claims, the invention may be practiced otherwise than as specifically described herein.

What is claimed is:

1. A scroll type fluid transferring machine which comprises a stationary scroll having a wrap member, a movable scroll having a wrap member combined with the stationary scroll, a driving means for causing the movement of revolution of the movable scroll along a circular orbit so as to make the movable scroll line-contact with the stationary scroll whereby a closed space is produced between the stationary and movable scrolls, and an Oldham ring for maintaining the stationary and movable scrolls at predetermined positions while the movement of rotation of the both scrolls are prevented, wherein the Oldham ring is formed by injection-molding.

2. The scroll type fluid transferring machine according to claim 1 wherein a strengthening material selected from the group consisting of carbon fibers, glass fibers and potassium titanate wiskers is incorporated in the polyketonsulfide.

3. The scroll type fluid transferring machine according to claim 2, wherein said strengthening material is incorporated in a range of 20% by weight–50% by weight.

* * * * *